Nov. 30, 1926.

J. PRYDZ 1,608,669

TAPERING ATTACHMENT FOR TURRET LATHES

Filed Jan. 26, 1925  4 Sheets-Sheet 1

INVENTOR.
JOHN PRYDZ.
BY HIS ATTORNEYS.

Nov. 30, 1926.
J. PRYDZ
1,608,669
TAPERING ATTACHMENT FOR TURRET LATHES
Filed Jan. 26, 1925    4 Sheets-Sheet 4
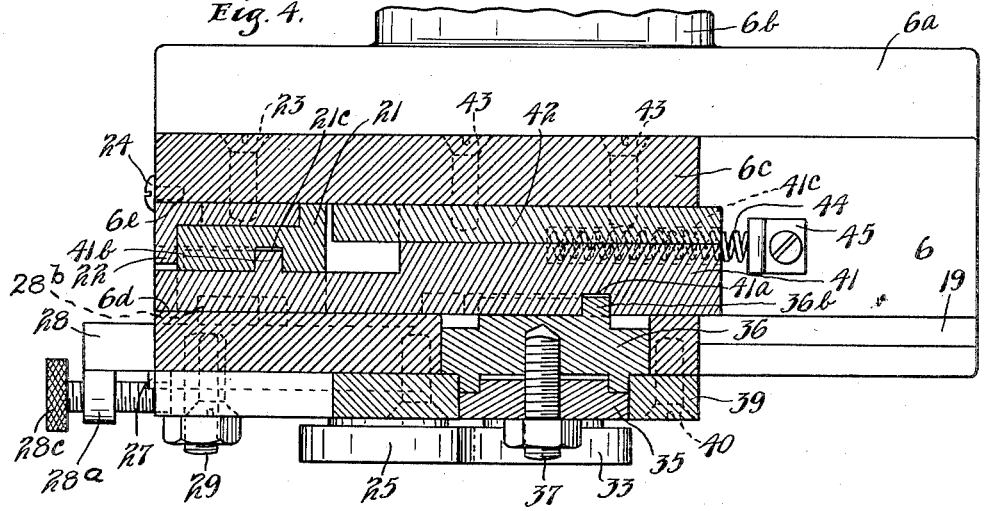
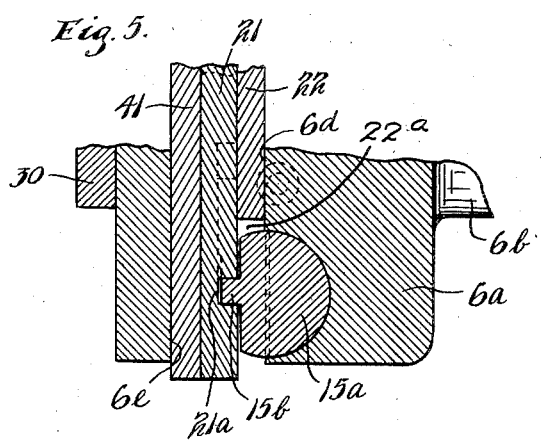
INVENTOR.
JOHN PRYDZ.
BY HIS ATTORNEYS.

Patented Nov. 30, 1926.

1,608,669

UNITED STATES PATENT OFFICE.

JOHN PRYDZ, OF MINNEAPOLIS, MINNESOTA.

TAPERING ATTACHMENT FOR TURRET LATHES.

Application filed January 26, 1925. Serial No. 4,684.

This invention relates to a taper attachment for a turning machine, and while the invention is capable of application to practically any type of metal or other turning machine, the same is particularly illustrated as applied to a turret lathe. The device is designed for turning straight or tapered bolts, pins or other parts in a turret lathe.

It is an object of this invention to provide a simple, compact and efficient device adapted conveniently to be supported on a movable carriage of a turning machine and which comprises a cutting tool, one or more work rests, and a slide movable in the device and controlled by a master taper rod, said slide having cam means thereon with which engage means controlling the movements of said cutting tool and work rests.

It is a further object of this invention to provide a taper cutting device comprising a head, a cutting tool movable in a straight line toward and from the work, a work rest movable toward and from the work, a slide movable in said head by a master taper rod, said slide having cam means thereon and means connected to and carrying said cutting tool and work rest co-operating with said cam means on said slide to be controlled thereby.

It is still another object of the invention to provide a taper attachment comprising a head adapted to be carried on the turret of a turret lathe, a cutting tool movable rectilinearly therein, a plurality of work rests movable rectilinearly therein, a slide reciprocable in said head by a master taper rod, and means connected to said cutting tool and work rests and connected to said slide to be moved thereby by means of a connection including means extending in an inclined direction with the longitudinal axis of said slide.

It is also an object of this invention to provide a taper attachment comprising a head through which the work is adapted to project, a cutting tool movable in said head toward and from the work and urged away from the work by resilient means, a slide movable in said head and means connected to said cutting tool and connected to said slide by a sliding connection comprising a member extending in an inclined direction relative to the longitudinal axis of said slide whereby, when said slide is moved in one direction said tool will be moved toward the work and when it is moved in the other direction said tool will be permitted to be moved away from the work by said resilient means.

It is further an object of the invention to provide such a taper cutting device as defined in the preceding paragraph, together with a work rest movable toward and from the work in said head, a slide connected to said work rest for moving the same, said latter slide being connected to the slide set forth in the preceding paragraph by a connection also including a member extending in an inclined direction to the longitudinal axis of said slide.

It is still another object of the invention to provide a taper turning attachment comprising a head, a cutting tool therein and one or more work rests therein, together with a slide movable in said head and having at opposite sides thereof, means for moving said work rests and cutting tool respectively, said means comprising a key and slot extending in an inclined direction to the longitudinal axis of said slide.

These and other objects and advantages of the invention will be fully set forth in the following description made in connection with the accompanying drawings in which like reference characters refer to the same parts throughout the different views, and in which, Fig. 1 is a view in front elevation of the head, the work being shown in cross section;

Fig. 4 is a horizontal section taken on the line 4—4 of Fig. 1, as indicated by the arrows; and Fig. 5 is a vertical section taken on the line 5—5 of Fig. 1 as indicated by the arrows.

Figure 1:
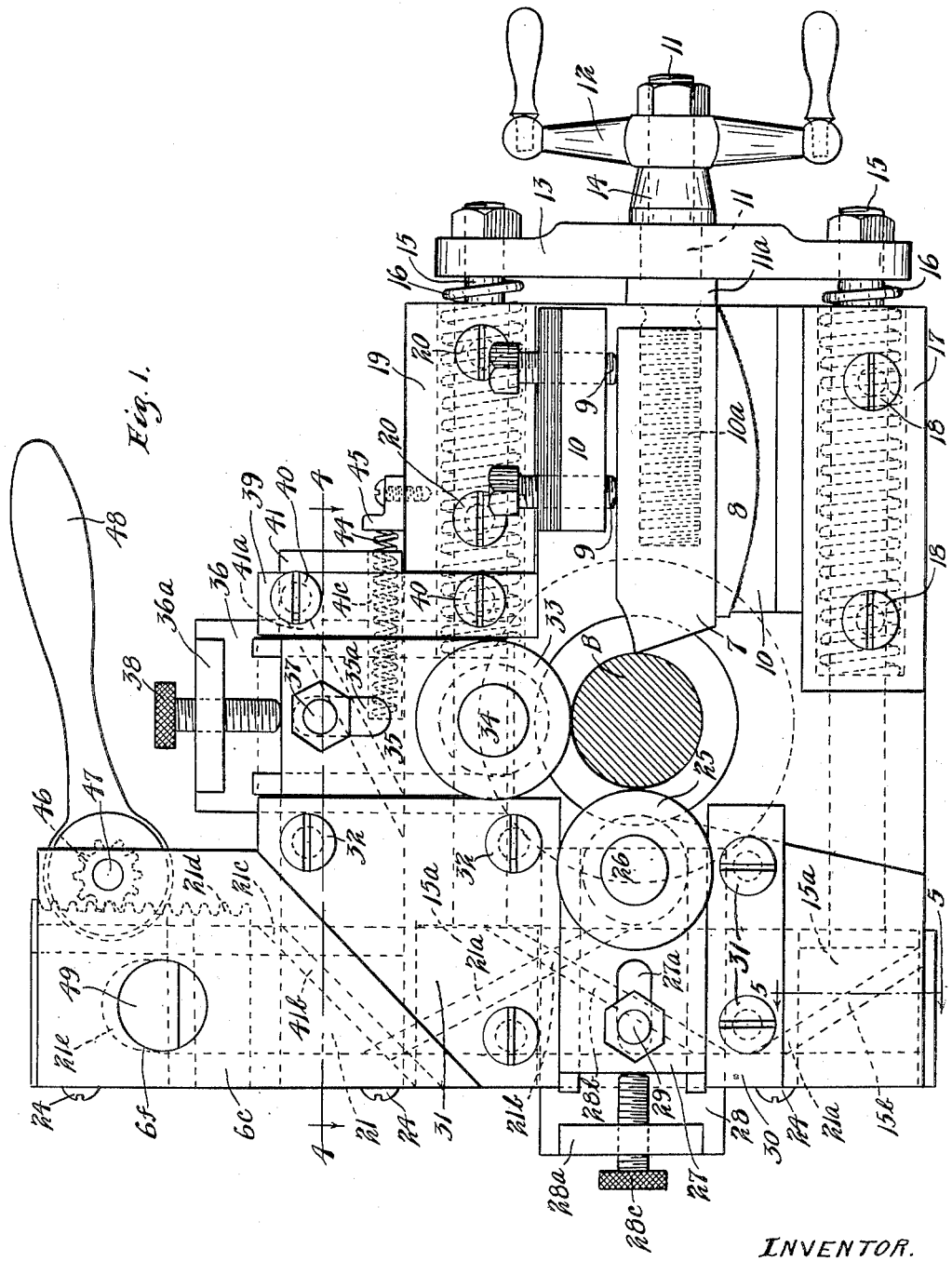
Figure 2:
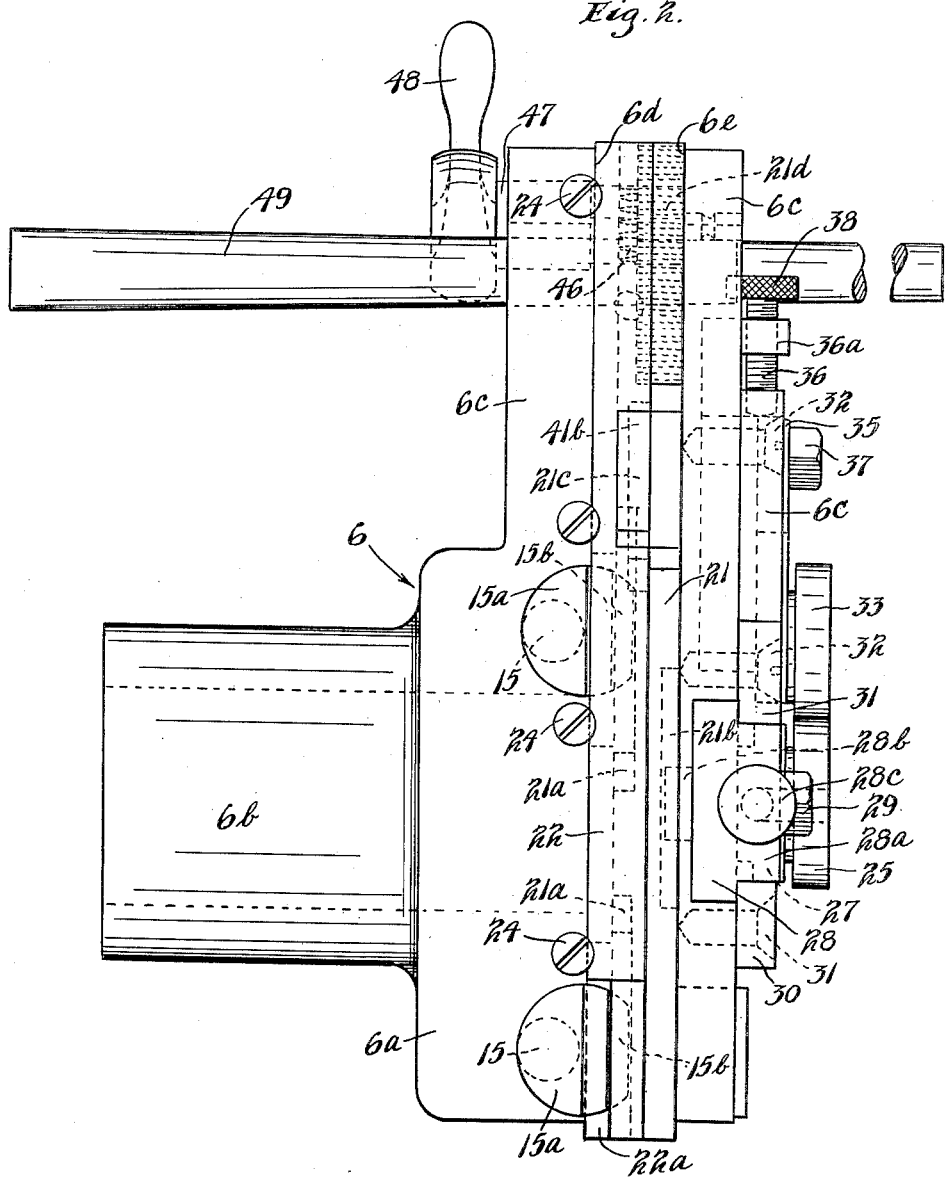
Fig. 2 is a view in side elevation, as seen from the left hand side of Fig. 1.
Figure 3:
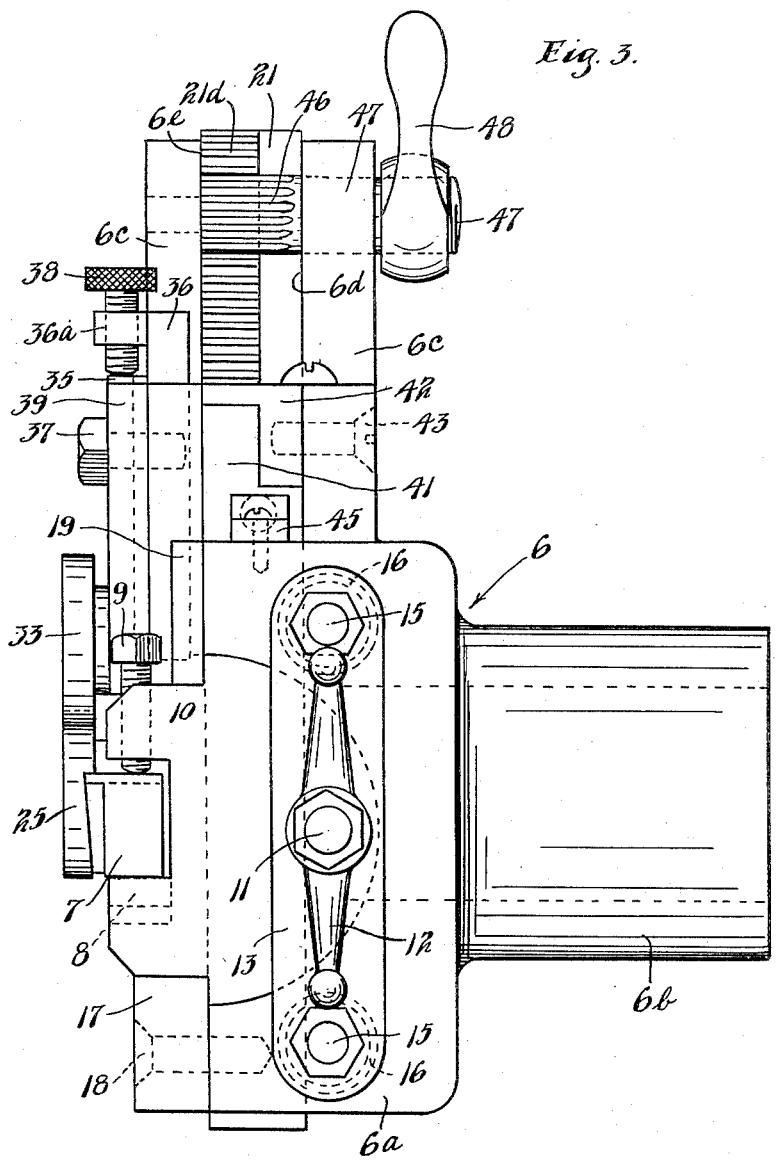
Fig. 3 is a view in side elevation, as seen from the right hand side of Fig. 1.

Referring to the drawings, the device comprises a head designated generally as 6, which head has a horizontal portion $6^a$ substantially rectangular in shape from which projects rearwardly a cylindrical portion or sleeve $6^b$. The sleeve $6^b$ is adapted to be placed in a suitable chuck in a turning machine or in the turret of the lathe. Said head also has a vertical portion $6^c$ extending upward from the portion $6^a$ which is also generally of rectangular shape. It will be seen, as shown in Fig. 1, that the work B extends axially through the sleeve 6ᵇ and through the head 6. The head carries at one side of the work a cutting tool 7 clamped between a tool plate 8 and a pair of clamping screws 9. The screws 9 extend through the top portion of a slide 10 having a groove or passage formed therein for receiving tool 7 and which has a curved seat below said tool on which tool plate 8 is carried. As shown in Fig. 3, the slide 10 has its rear side of semi-cylindrical form and fits in a semi-cylindrical passage formed in the head 6 and slidable in the portion 6ᵃ of said head. The said slide 10 has formed therein a threaded portion 10ᵃ forming a nut with which engages a screw 11 having secured to its outer end a double crank handle member 12, said handle being mounted on said screw and held thereon by a nut threaded onto the end of said screw. The handle is spaced from a transverse bar 13 through which said screw also passes by a collar 14, said screw having a collar or enlargement 11ᵃ formed thereon between the bar or plate 13 and the slide 10. It will be seen that by turning of the handle 12 the slide 10 and tool 7 will be moved in a rectilinear path toward and from the work B. The plate 13 has holes at its opposite ends through which project rods 15 having nuts on their threaded outer ends abutting the outer side of plate 13. The rods 15 inwardly of the plate 13 are surrounded by compression coiled springs 16, said springs being disposed in recesses or bores formed in the portion 6ᵃ of the head 6 and abutting at their inner ends against the inner ends of said recesses. The rods 15 extend through head 6 and the portion 6ᵃ thereof beyond the ends of said recesses and each rod has secured to or formed thereon at its other end a semi-cylindrical head 15ᵃ. It will be seen from Figs. 2 and 5 that the heads 15ᵃ are eccentric in relation to the rods 15, said heads being of substantially twice the diameter of said rods 15 and substantially tangential to or flush therewith at one side. The heads 15ᵃ slide in semi-cylindrical recesses in portions 6ᵃ of head 6 and have their front sides flattened and have keys or ribs 15ᵇ projecting from said flat sides, said keys or ribs extending in an inclined direction to the axes of rods 15, as shown in Fig. 1. The slide 10 is retained in place in the semi-cylindrical channel of portion 6ᵃ of head 6 by a bottom plate 17 secured to head 6 by the screws 18 and which overlaps a flat portion of slide 10 and seats against the bottom side thereof and also by a plate 19 secured to portion 6ᵃ of head 6 by screws 20 which overlaps a flat portion of slide 10 and rests against the upper side of said slide. The heads 15ᵃ are cut-away at their outer ends to clear a plate or gib 22 to be later described.

The keys or ribs 15ᵇ fit and are disposed in grooves 21ᵃ formed in the rear side of a main slide member 21 which is vertically movable in a slot or opening formed in the head 6 and in the portions 6ᵃ and 6ᶜ thereof, said slide extending from the top to the bottom of head 6 and being held in place in said head by a plate or gib 22, said plate 22, as shown in Fig. 4, fitting in a groove or cut-away portion of the slide 21 and overlapping one side thereof. The member 22 is held in place by screws 23 extending through head 6 from the rear thereof and member 22 is further adapted to be adjusted into proper relation to the slide 21 by a plurality of screws 24 secured in the end of head 6, the heads of which overlap plate 22. The plate 22 also extends from the top to the bottom of head 6 but has a cut-away portion 22ᵃ at its lower end to accommodate the movement of heads 15ᵃ. It may be stated that there is a passage extending vertically from top to bottom of head 6 and in the portions 6ᶜ and 6ᵃ thereof which extends between the flat surfaces 6ᵈ and 6ᵉ. The slide 21, plate 22 and the other parts to be described are disposed in this passage.

A work rest 25 is also carried in head 6, and while the work rest may be made in any suitable and desired form, in the embodiment of the invention illustrated, the same is shown as in the form of a roller contacting the sides of the work substantially opposite the tool 7. The roller is mounted on a suitable stud 26 secured in a slide 27. Slide 27 is slidable in and disposed in a guideway formed in a larger slide 28 movable rectilinearly toward and from the work and in the embodiment of the invention illustrated, having its center substantially in horizontal alinement with the axis of the work. The slide 27 is held in adjusted position in slide 28 by clamping screw 29 and is also held and adapted to be moved inwardly in said slide by a screw 28ᶜ shown as having a knurled head and being threaded in and extending through an upstanding rib 28ᵃ at the end of slide 28, the inner end of screw 28ᶜ engaging the outer end of slide 27. It will be noted that slide 27 is provided with an elongated slot 27ᵃ to accommodate its movement relatively to screw 29 which is threaded into the slide 28. The slide 28 has its outer end extending across the vertical main slide 21 and is provided with a projecting key or rib 28ᵇ which fits in and is adapted to slide in a groove 21ᵇ formed in the front side of slide 21, as shown in Fig. 1. The slide 28 is held in place on head 6 by a lower plate 30 secured by screws 31 which overlaps the front flat surface of slide 28 and contacts the bottom side thereof. The slide 28 is also held in place by a plate 31 having its upper corner formed on a diagonal, the lower side of which overlaps a front flat surface at the top of slide 28 and the lower edge of which contacts with the top side of slide 28. The plate 31 is held in place by screws 32.

A work rest 33 is also provided shown as disposed substantially above the work B and while this rest may be made in any suitable or desirable form, in the embodiment of the invention illustrated, the same is shown as a roller mounted upon a stud 24 extending through and secured in a slide 35. The slide 35 is carried by and movable in a guideway formed in a slide 36. The slide 35 is held in position on the slide 36 by a clamping screw 37 having a clamping nut thereon and which extends through an elongated slot 35$^a$ in the slide 35. The slide 36, like slide 28 has an upstanding rib 36$^a$ at its outer end through which extends a screw 38 having a knurled head, the inner end of which screw bears against the outside of slide 35. The slide 36 is held in place in the head 6 by the plate 31 which overlaps a flat surface on the front thereof and contacts with a side portion thereof and slide 36 is also held in place by a plate 39 secured to head 6 by screws 40, which plate also overlaps a flat surface at the front of slide 36 and contacts with one side portion thereof. The rear side of slide 36 is flat and bears against the front surface of a transversely and horizontally extending slide 41 and slide 36 has a rearwardly projecting rib or key 36$^b$ which fits in and is slidable in a slot 41$^a$ in the front surface of slide 41. Said key 36$^b$ and slot 41$^a$ extend in an inclined direction to the longitudinal center line of slide 36 as well as the longitudinal center line of slide 41, as clearly shown in Fig. 1. The slide 41 is also held in position by a gib or plate 42 contacting its rear side and extending over its top side, which plate 42 is secured by screws 43 extending thereinto from the rear of head 6. The slide 41 extends to the left, as shown in Figs. 1 and 4 and is cut-away to extend across the flat front surface of slide 21 and is provided with a key or rib 41$^b$ which fits in and is adapted to move in a slot 21$^c$ formed in the front surface of slide 21. Said key 41$^b$ and slot 21$^c$ extend at an inclination to the longitudinal axis of slide 41 as well as to the longitudinal axis of slide 21 and make with said axes an angle of substantially 45 degrees. The slide 41 at its right hand end, is provided with a recess 41$^c$ in which is disposed a compression coiled spring 44 bearing at one end against the bottom of said recess 41$^c$ and at its outer end against a stop member 45 secured to the top of portion 6$^a$ of head 6. It will be seen that spring 44 normally urges slide 41 toward the left, as shown in Fig. 1. The slide 21 is formed on one side edge, as shown in Figs. 1, 2 and 3, with rack teeth 21$^d$ which are engaged by a pinion 46 mounted on or formed on a shaft 47 journaled in portion 6$^c$ of head 6 and having a handle 48 secured at its outer end. The spaced parts of portion 6$^c$ of the head 6 are provided with alined circular holes 6$^f$ and the slide 21 is provided with an aperture 21$^e$ semi-circular at its top portion and of rectangular shape at its lower portion. A master taper rod 49 extends through the spaced parts of the portion 6$^c$ of head 6 through the holes 6$^f$, which rod, at its larger end is of substantially the same diameter as the diameter of said holes but which has its lower side flattened, as shown in Fig. 1. The lower flattened side of this taper rod 49 bears against the flat lower side of the hole 21$^d$ formed through slide 21.

In operation, as stated, the head 6 is held in the turret of the lathe and the taper rod 49 projects into the head, as shown in Fig. 2. The other end of this rod 49 is adapted to abut against a suitable stop on the lathe which is not shown. The slide 21 normally is moved upwardly with the flat surface at the bottom of aperture 21$^b$ in engagement with the bottom of taper rod 49. This upward movement is caused by the springs 16 tending to move rods 15 to the right, as shown in Fig. 1, and the keys 15$^b$ act on the slots in slide 21. Spring 44 also tends to move slide 41 to the left, as shown in Fig. 1, and this, through key 41$^a$ also tends to raise the slide 21, the head 6 being in position and the work rests 25 and 33 properly adjusted against the work, through slides 27 and 35 and by screws 28$^c$ and 38 and the tool 7 being properly positioned by handle 12, the carriage of the lathe which carries the turret will be moved so that the head is moved to the right, as seen in Fig. 2. The rod 49 is thus moved relatively to head 6 and slide 21 and thus said rod moves relatively to slide 21 or through the same, and the flat tapered lower surface of the rod allows slide 21 to be moved upwardly by springs 16 and 14. This slide 21 moves upwardly and grooves 21$^a$ therein act on the keys 15$^b$ and the heads 15$^a$ of rods 15 and said rods are moved to the right. This permits movement of slide 10 to the right under the action of springs 16 on plate 13 and the tool 7 is progressively moved away from the work in accordance with the taper of rod 49. At the same time, the groove 21$^b$ in the slide 21 acts on the key 28$^b$ in slide 28 and moves said slide to the left, as shown in Fig. 1, so that work rest 25 is progressively moved away from the work, as tool 7 is moved away from the work, and upward movement of slide 21 simultaneously through the groove 21$^c$ acts on key 41$^b$ and slide 41 is moved to the left the same distance that slide 21 moves downwardly. This movement of slide 41 to the left causes movement of slide 36 upwardly on account of the groove 41ª acting on the key 36ᵇ. Slide 36 moving upwardly carries upwardly the work rest roller 33 so that said roller is progressively moved away from the work simultaneously with the roller 25 and tool 7. A taper is thus formed on the work as the same is turned, the work being turned of progressively larger diameter and being contracted at all times by the work rests 25 and 33. The handle 48 is provided so that slide 21 can be moved to free the same from engagement with the taper rod 49 against the tension of springs 16 and 44 so that the head can be moved outwardly when the taper is finished. It will be seen that, owing to the close snug fit between the grooves and keys in slide 21, and the groove 41ª and key 36ᵇ, that the work rest and tools are accurately moved by the slot 21. Direct motion is imparted to the rods 15 and to the slide 28 by the slide 21 and direction motion is imparted to the work rest 33 and slide 36 by the slide 41. It will also be noted that both the cutting tool 7 and the work rests 25 and 33 move toward and from the work in straight line. It will also be noted that the angle which groove 41ª makes with the longitudinal axis of slide 41 is the same as the angle which grooves 21ª and 21ᵇ make with the longitudinal axis of slide 21.

From the above description it is seen that applicant has provided a very simple, compact, efficient and accurate taper cutting device for a turning machine. The parts are easily made and assembled and are very compactly arranged. The device has been amply demonstrated in actual use and has been found to be very successful and efficient.

It will, of course, be understood, that various changes may be made in the form, details, arrangement and proportions of the parts without departing from the scope of applicant's invention which, generally stated, consists in the novel parts and combination of parts disclosed and defined in the appended claims.

What is claimed is:

1. A tapering attachment for a turning machine comprising a head, a cutting tool, means movable in a rectilinear path in said head toward and from the work and carrying said tool, a work rest, means movable in said head toward and from the work and carrying said work rest, a second work rest, a member movable in said head toward and from the work carrying said last mentioned work rest, a slide movable in a rectilinear path engaging said member to move the same, and a main slide movable in said head connected to both said means and to said first mentioned slide by a sliding connection to move the same and move said cutting tool and work rests.

2. A tapering attachment for a turret lathe comprising a head through which the work projects adapted to be carried by a turret, a cutting tool, a slide in said head carrying said tool, a pair of rods disposed, respectively, at each side of said slide, a member connected to said rods and slide, springs urging said member to move outwardly to move said tool from said work, a second slide movable in said head, said rods being connected to said second slide by keys and slots inclined to the longitudinal axis of said second slide whereby said rods will be moved by movement of said second slide.

3. A tapering attachment for a turret lathe having in combination, a head through which the work extends carried by the turret, a tool at one side of the work, a work rest at the opposite side of the work, a slide movable vertically at the latter side of the work, means urging the cutting tool away from the work, means connected to said tool and engaging an inclined surface on said slide to be moved thereby, and means connected to said work rest and engaging an inclined surface on said slide to be moved thereby, and a taper bar extending through said slide adjacent its top to move the same whereby said tool and work rest are moved inwardly by movement of said slide in one direction, said work rest is moved outwardly and said tool movable away from said work by movement of said slide in the opposite direction.

4. A tapering attachment for a turret lathe having in combination, a head through which the work extends carried by the turret, a tool at one side of the work, a work rest at the opposite side of the work, a slide movable vertically at the latter side of the work, means urging the cutting tool away from the work, means connected to said tool and engaging an inclined surface on said slide to be moved thereby, a work rest above the work, means connected to said last mentioned work rest and engaging an inclined surface on said slide to be moved thereby, and a taper rod extending through said slide and adapted to move the same whereby said work rests will be moved inwardly and outwardly by movements of said slide in opposite directions, respectively and said cutting tool will be moved inwardly by movement of said slide in one direction and permitted to be moved outwardly by said first mentioned means when said slide moves in the opposite direction.

5. A tapering attachment for a turret lathe comprising a head adapted to be carried by the turret through which the work projects, a cutting tool carried by said head and movable toward and from the work in a straight path, work rests carried by the head and movable toward and from the work in straight paths, a vertically movable slide in said head having spaced inclined grooves in one side thereof and spaced inclined keys on its opposite side, means controlling the movement of said cutting tool having keys fitting in said grooves, and means controlling the movements of said work rests having grooves in which said first mentioned keys are disposed.

6. A tapering attachment for a turret lathe having in combination, a head through which the work projects adapted to be carried by the turret, a cutting tool in said head, a slide carrying said tool, a pair of rods connected to said slide and adapted to be moved for moving said tool toward the work, a pair of springs urging said slide and tool away from the work, a work rest opposite said tool, a slide carrying said work rest movable toward and from the work, a work rest above the work, a slide carrying said latter work rest movable toward and from the work, a member slidably movable at an angle to said last mentioned slide and connected thereto by a key and groove connection extending at an angle to said member and last mentioned slide, a main slide in said head, key and groove connections between said main slide and said rods, a key and groove connection between said main slide and said second mentioned slide, a key and groove connection between said main slide and said member, and a taper bar extending through said main slide for moving the same whereby movement of said main slide will move said work rests and cutting tool.

7. The structure set forth in claim 6, and a spring normally urging said member in one direction.

8. The structure set forth in claim 6, a spring normally urging said member in one direction, and manually operated means for moving said main slide to move the same from engagement with said taper rod against the tension of all of said springs.

In testimony whereof I affix my signature.

JOHN PRYDZ.